(12) United States Patent
Manssart (10) Patent No.: US 7,740,274 B2
(45) Date of Patent: Jun. 22, 2010

(54) AIRBAG VENT

(75) Inventor: Xavier Manssart, Villeurbanne (FR)

(73) Assignee: Zodiac Automotive US Inc., Tempe, AZ (US)

( * ) Notice: Subject to any disclaimer, the term of this patent is extended or adjusted under 35 U.S.C. 154(b) by 450 days.

(21) Appl. No.: 11/732,550

(22) Filed: Apr. 4, 2007

(65) Prior Publication Data
US 2007/0246922 A1    Oct. 25, 2007

Related U.S. Application Data

(60) Provisional application No. 60/789,451, filed on Apr. 5, 2006.

(51) Int. Cl.
*B60R 21/239* (2006.01)
(52) U.S. Cl. .................................. 280/739
(58) Field of Classification Search ............ 280/739, 280/736, 742
See application file for complete search history.

(56) References Cited

U.S. PATENT DOCUMENTS

| | | | | |
|---|---|---|---|---|
| 5,492,363 | A | * | 2/1996 | Hartmeyer et al. ......... 280/739 |
| 5,725,244 | A | * | 3/1998 | Cundill .................... 280/739 |
| 6,056,318 | A | * | 5/2000 | Braunschadel ............. 280/739 |
| 2007/0170710 | A1 | * | 7/2007 | Bouquier ................... 280/739 |
| 2007/0246922 | A1 | * | 10/2007 | Manssart ................... 280/739 |
| 2008/0277912 | A1 | * | 11/2008 | Denys et al. ............... 280/739 |
| 2009/0267333 | A1 | * | 10/2009 | Pittiglio et al. ............. 280/740 |

FOREIGN PATENT DOCUMENTS

EP    1 575 810 A1    9/2005
FR    2 805 505       8/2001

OTHER PUBLICATIONS

Extended European Search Report in related Application No. EP 07251493.8 dated Oct. 7, 2008.

* cited by examiner

*Primary Examiner*—Paul N Dickson
*Assistant Examiner*—Karen Jane J Amores
(74) *Attorney, Agent, or Firm*—Dean W. Russell; Jason D. Gardner; Kilpatrick Stockton LLP (57) ABSTRACT

Certain aspects and embodiments of the present invention provide an airbag having a vent that can adaptively release gas from the airbag upon impact with an occupant. The vent may include a membrane and/or diaphragm that can control the amount of gas released from the airbag based on the pressure in the airbag. During a collision, the airbag can be filled with gas and absorb the energy from an occupant causing the pressure in the airbag to increase. The adaptive vent can release gas from the airbag by opening when the occupant impacts the airbag. In some embodiments, the size of the vents changes depending on the pressure existing in the airbag.

25 Claims, 7 Drawing Sheets

AIRBAG VENT

CROSS REFERENCE TO RELATED APPLICATIONS

This application claims benefit of U.S. Provisional Patent Application Ser. No. 60/789,451, entitled "Adaptative Vent Patent" and filed Apr. 5, 2006, the entire contents of which are hereby incorporated by this reference.

FIELD OF THE INVENTION

The present invention relates generally to airbags and more particularly to airbags having an adaptive vent.

BACKGROUND OF THE INVENTION

Generally, an airbag is a structure that includes an inflatable safety bag, such as a flexible bag, that can be inflated to contain air or some other gas. Airbags are commonly used to rapidly inflate and provide cushioning during a vehicle collision. For example, an airbag can be installed in a steering wheel of a vehicle and associated with a sensor that, upon sensing a collision with force exceeding a certain threshold, triggers the airbag to expel a gas and deploy the safety bag to provide cushioning for the individual in the vehicle. The inflatable safety bag can include one or more vents that allow the gas to be released relatively slowly from the safety bag when the individual pushes against the safety bag.

Depending on factors associated with a crash, including the weight of an occupant, the vents of a deployed airbag may not release the gas at a rate to protect the occupant from sustaining injuries due to the crash or, although generally less severe, injuries from the occupant's impact with the airbag. For example, the vents may be too small to release gas at a rate necessary to adequately cushion an occupant's impact with the airbag, thereby causing the occupant to sustain injuries.

Accordingly, a need exists for an airbag that can adaptively release gas to cushion an impact from an occupant. A need further exists for an airbag having vents that can adaptively release gas depending on a variety of factors associated with a crash and/or an occupant.

SUMMARY OF THE INVENTION

Certain aspects and embodiments of the present invention provide an airbag having one or more vents that can adaptively release gas from the airbag upon impact with an occupant. The airbag may contain one or more holes associated with a structure such as a membrane and/or a diaphragm. The membrane and/or diaphragm may be adapted to control the amount of gas released from the airbag. During a collision, the airbag can be filled with gas and absorb the energy from an occupant. The adaptive vent can release gas from the airbag by opening when the occupant impacts the airbag. The amount of gas released can be dependent on the pressure in the airbag. In some embodiments, the size of the vents changes depending on the pressure existing in the airbag when the occupant contacts the airbag. For example, the vent size increases if the pressure in the airbag increases due to the impact.

In some embodiments of the present invention, the airbag includes a membrane covering the airbag opening and connected to the airbag by one or more membrane support members. The membrane may be a resilient membrane, such as, for example, a silicone membrane. The membrane can cover the airbag opening before the occupant impacts the airbag and can allow gas to escape from the airbag through the opening when the airbag experiences pressure at a preset level from the impact with the occupant. In some embodiments, a diaphragm may be attached to the airbag alternatively or in addition to the membrane. The membrane and/or diaphragm may regulate the size of the opening during deceleration when the occupant impacts the airbag.

In some embodiments of the present invention, the membrane support members may be resilient and adapted to elongate when pressure in the airbag increases. When the membrane support members elongate, the membrane can break or otherwise uncover the airbag opening and allow the gas within the airbag to be released. The greater the airbag pressure, the more the membrane support members elongate. As the membrane support members elongate, the more the airbag opening is uncovered and the more gas is released from the airbag. The amount of elongation of the membrane support members may be adjusted based at least in part on one or more of the thickness or modulus of the membrane support members, shape of the membrane and membrane support members, number of membrane support members, and size of the membrane support members.

A diaphragm may be attached to the airbag alternatively or in addition to the membrane to provide an adaptive vent that releases gas from the airbag based on pressure in the airbag. The diaphragm may be connected to the airbag with diaphragm support members that may be similar to the membrane support members. When the pressure in the airbag meets or exceeds a preset level, the diaphragm support members may elongate or otherwise expand and the diaphragm contracts to exert a pressure on the airbag near the opening to release more gas from the airbag.

Optional, non-exclusive objects of the present invention thus include an airbag having an adaptive vent that can release more or less gas from the airbag depending on the pressure within the airbag.

Another optional, non-exclusive object of the present invention includes an airbag that can adaptively release gas depending on the severity of a collision and/or the size of the occupant.

An additional optional, non-exclusive object of the present invention is to provide an airbag having a vent that releases gas from the airbag at a rate depending on at least one of the speed, weight, and position of an occupant.

An additional optional, non-exclusive object of the present invention is to provide an airbag that links the pressure inside the airbag to the vent diameter to adaptively release gas by adjusting the diameter of the vent based on the pressure inside the bag.

An additional optional, non-exclusive object of the present invention is to provide a membrane having a high efficiency and adaptive vent size.

Other objects, features, and advantages of the present invention will become apparent with reference to the remainder of the text and the drawings of this application.

DETAILED DESCRIPTION OF THE INVENTION

Airbags according to some embodiments of the present invention include an adaptive vent that can release gas based, at least in part, on the pressure in the airbag. The pressure in the airbag may be based on at least one of the severity of a collision or size and position of an occupant. When a collision occurs, an airbag absorbs energy from the occupant. When the energy is absorbed, the pressure of the gas within the airbag increases. The airbag may include one or more vents in which the size or shape of the vent changes based, at least in part, on the amount of pressure in the airbag. For example, as the pressure in the airbag increases, the size of the one or more vents may increase and allow more gas to escape the airbag and provide the occupant with a cushioned support.

Figure 1:
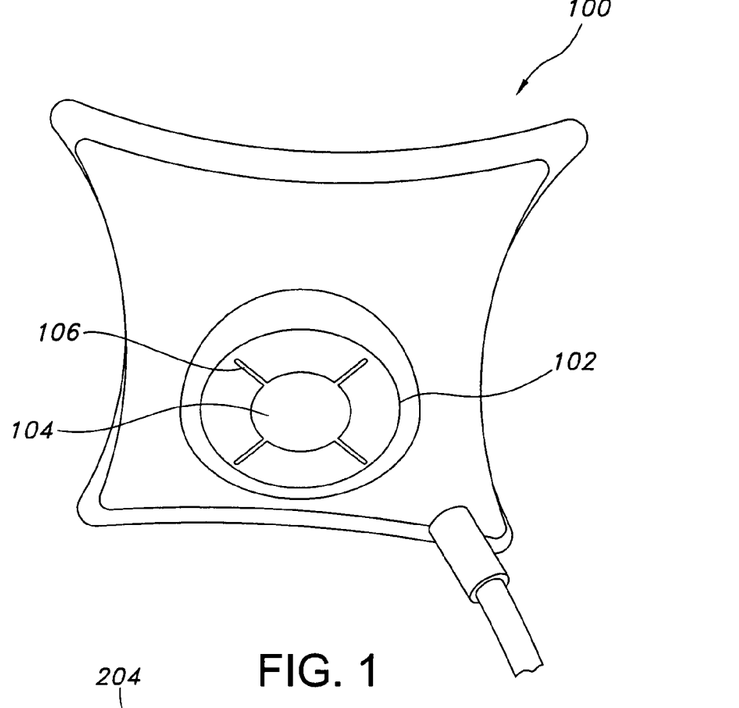
FIG. 1 is an airbag having a membrane according to one embodiment of the present invention.

The airbag vent may include a membrane and/or diaphragm that are adapted to change size or shape of an opening that allows gas to exit the airbag, depending on the pressure within the airbag. FIG. 1 illustrates one embodiment of an airbag 100 with a vent 102. The vent 102 includes a membrane 104 covering an opening (not shown) in the airbag 100. The membrane 104 is connected to the airbag 100 by membrane support members 106. In some embodiments, the membrane support members 106 are glued to the airbag 100. When the airbag 100 deploys, the membrane covers the airbag opening and prevents gas from exiting the airbag 100. Upon impact with the occupant, the membrane support members 106 may be adapted to elongate or stretch as the pressure in the airbag increases.

When the membrane support members 106 elongate, they cause the membrane 104 to change position and allow gas to exit the airbag through the opening. In some embodiments of the present invention, the membrane support members 106 may be adapted to break apart from the membrane 104 and allow gas to exit the airbag 100. The more pressure in the airbag 100, the more the membrane support members 106 elongate. The more the membrane support members 106 elongate, the more the membrane 104 allows gas to exit the airbag 100.

The membrane 104 and/or membrane support members 106 may be a silicone material and shaped in any desirable shape. For example, the vent 102 may include any number of membrane support members 106. The amount of gas released from the airbag 100 can be controlled by changing attributes of the vent 102. For example, the amount of gas released due to pressure in the airbag may depend on the number, size, shape, thickness or modulus of membrane support members 106 and/or membrane 104.

Figures 2, 3:
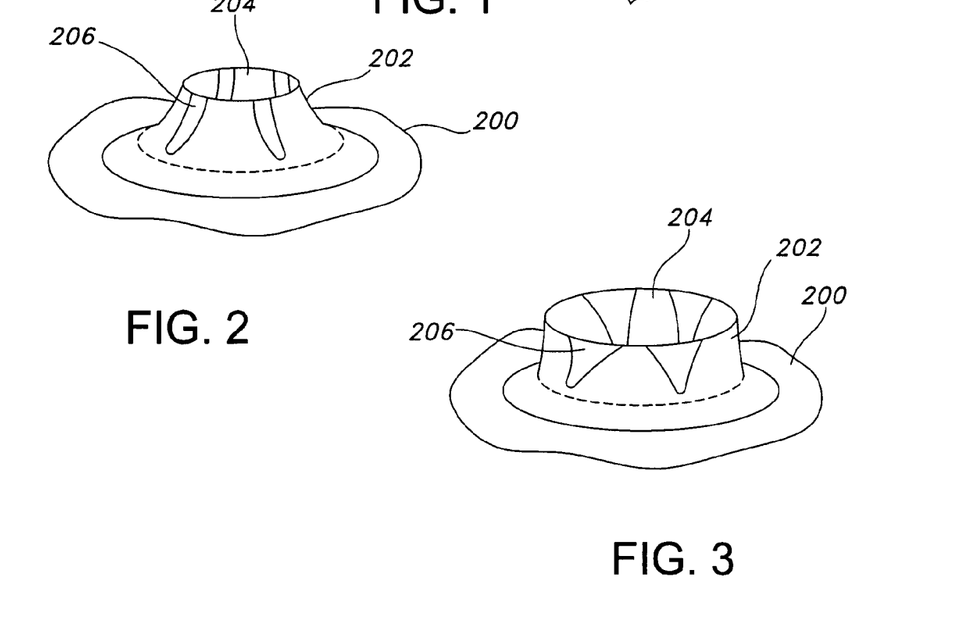
FIG. 2 is a perspective view of an airbag having a membrane according to one embodiment of the present invention.
FIG. 3 is a perspective view of the membrane of FIG. 2 with vents expanded.

FIG. 2 illustrates one embodiment of an airbag portion 200 around an opening (not shown) in the airbag and an adaptive vent 202. The adaptive vent 202 includes a membrane 204 connected to the airbag by membrane support members 206. FIG. 2 shows the airbag portion 200 being inflated, but not experiencing an impact with an occupant. The membrane 204 prevents gas from leaving the airbag through the opening. In some embodiments, the membrane 204 may allow some gas, such as a relatively small portion, to leave the airbag before the occupant impacts the airbag.

FIG. 3 illustrates the airbag portion 200 and adaptive vent 202 when an occupant impacts the airbag. The pressure in the airbag increases when the occupant impacts the airbag due to the force exerted on the airbag by the occupant. The force exerted on the airbag by the occupant can be related to the severity of the crash (i.e. the force of the crash) and/or the weight and position of the occupant. When the occupant impacts the airbag, the pressure in the airbag increases and causes the membrane support members 206 to elongate and/or expand. As the membrane support members 206 elongate or expand, the membrane 204 opens to allow gas to exit the airbag. As the pressure in the airbag increases, the membrane 206 allows more gas to exit the airbag to absorb the energy from the occupant during, or just after, the collision.

Figure 4:
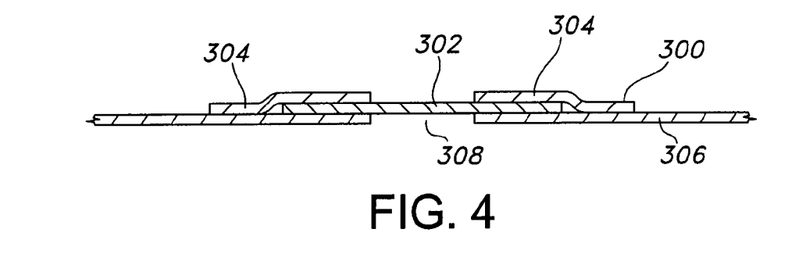
FIG. 4 is a side view of the membrane of FIG. 2.

FIG. 4 illustrates a side view of an adaptive vent 300 before the occupant impacts the airbag. The adaptive vent 300 includes a membrane 302 and membrane support members 304 connecting the membrane 302 to airbag fabric 306. As the pressure in the airbag increases, the membrane support members 304 can elongate or otherwise expand and the membrane 302 allows gas within the airbag to exit an airbag opening 308.

Figures 5, 6, 7:
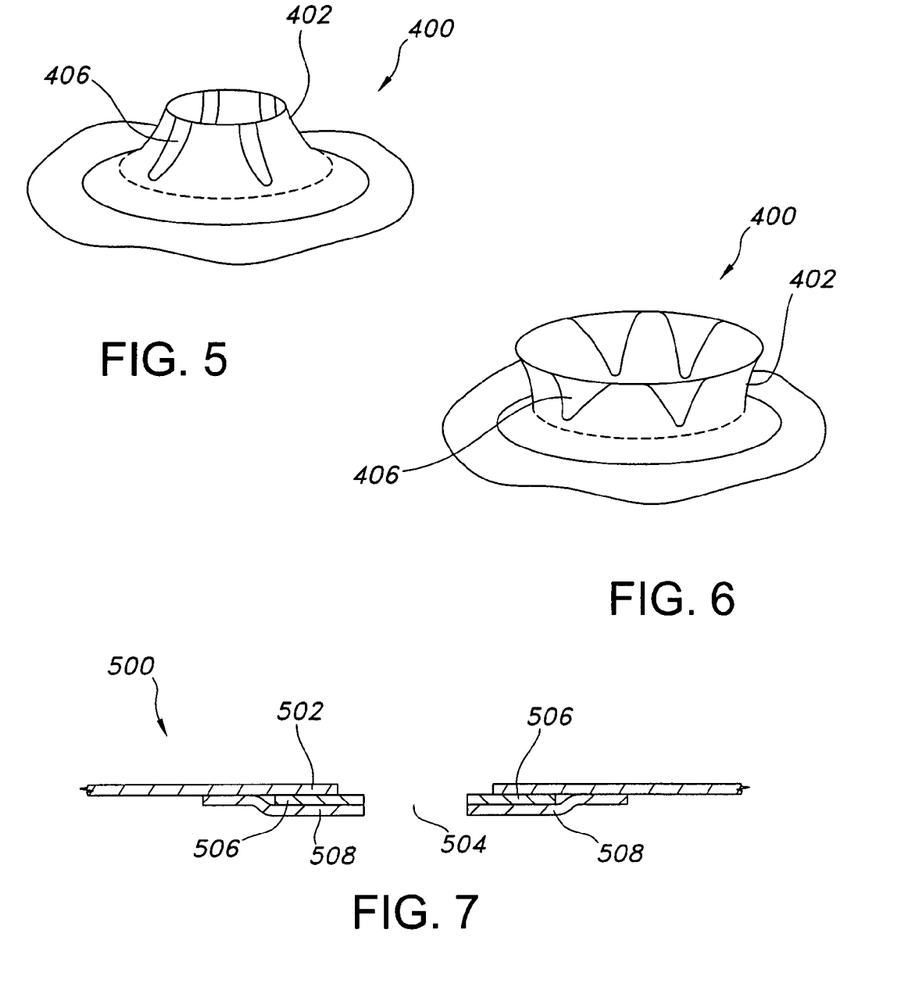
FIG. 5 is a perspective view of an airbag having a diaphragm according to one embodiment of the present invention.
FIG. 6 is a perspective view of the airbag of FIG. 5 with increased pressure in the airbag.
FIG. 7 is a side view of the airbag of FIG. 5.

In some embodiments of the present invention, the adaptive vent may include a diaphragm connected to an airbag using diaphragm support members that can adaptively vent the gas in the airbag. FIGS. 5-6 illustrate one embodiment of an airbag portion 400 with an adaptive vent 402. The adaptive vent 402 includes a diaphragm (not shown) connected to the airbag portion 400 by diaphragm support members 406. FIG. 5 shows the adaptive vent 402 before the occupant impacts the airbag. During this phase, the diaphragm opens the vent and allows gas to exit the airbag at a normal or constant rate. When the occupant impacts the airbag causing the pressure in the airbag to increase, the diaphragm support members 406 expand, as shown in FIG. 6, and cause the diaphragm to contract and change the size and shape of the airbag opening to allow gas to exit the airbag at a faster rate.

The rate at which the gas exits the airbag may be based in part on the size, shape and quantity of the diaphragm support members 406. For example, as the number of diaphragm support members 406 increases, the more pressure in the airbag is needed to elongate or expand the diaphragm support members 406 and more pressure is needed to cause the diaphragm to contract. The diaphragm and diaphragm support members 406 may be made from any expandable material, an example of which is a silicone material.

FIG. 7 illustrates a side view of an airbag portion 500 with an adaptive vent 502 associated with an airbag opening 504 before the occupant impacts the airbag. The adaptive vent 502 includes a diaphragm 506 and diaphragm support members 508 connecting the diaphragm 506 to airbag fabric 510. As the pressure in the airbag increases, the diaphragm support members 508 may elongate or otherwise expand and cause the diaphragm 506 to contract. When the diaphragm 506 contracts, it causes the opening 504 to increase in size and allows more gas to exit the airbag.

Figure 8:
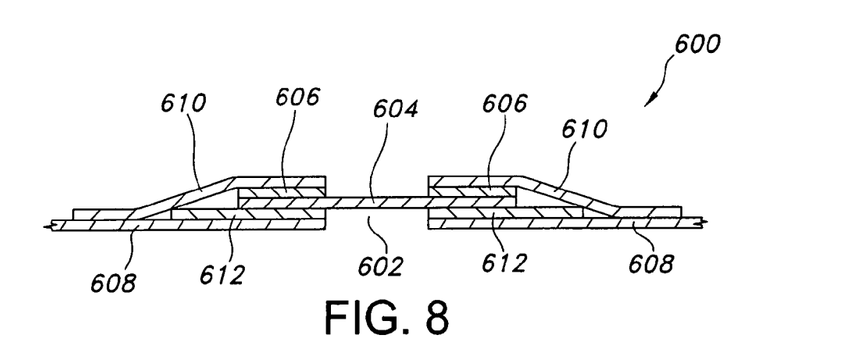
FIG. 8 is a side view of an airbag having a membrane and a diaphragm according to one embodiment of the present invention.
Figure 9:
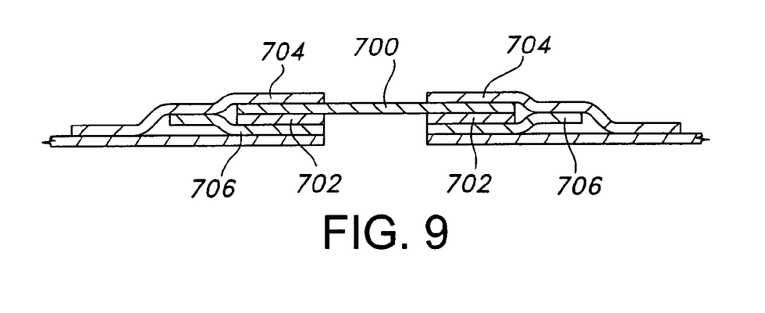
FIG. 9 is a side view of a second embodiment of an airbag having a membrane and diaphragm.
Figure 10:
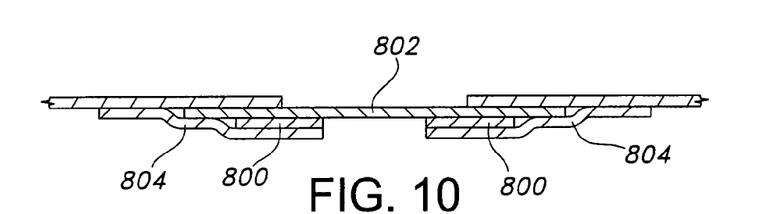
FIG. 10 is a third embodiment of an airbag having a membrane and a diaphragm.

Adaptive vents according to some embodiments of the present invention may include a membrane and a diaphragm connected to an airbag by support members. FIGS. 8-10 illustrate embodiments of adaptive vents with a membrane and a diaphragm to adaptively release gas from the airbag based on the pressure in the airbag. For example, FIG. 8 shows an airbag portion 600 with an opening 602 and a membrane 604 covering the opening 602. A diaphragm 606 may be associated with the membrane 604. The membrane 604 and diaphragm 606 can be connected to airbag fabric 608 by support members 610. In some embodiments, the diaphragm 606 and membrane 604 may be reinforced to prevent the diaphragm 606 and/or membrane 604 from detaching from the airbag by reinforcement member 612.

As the pressure in the airbag increases, the support members 610 may elongate or expand and cause the membrane 604 to open and allow gas to exit the opening 602. The diaphragm 606 may also contract and cause more gas to exit the opening 602. The amount and/or rate of gas released may depend on the pressure in the airbag and may also depend on the quantity, size, shape, thickness, and modulus or the support members 610.

Adaptive vents having a membrane and a diaphragm may be provided in a variety of configurations. For example, FIG. 8 shows the diaphragm 606 between the membrane 604 and support members 610 with a reinforcement member 612. FIG. 9 shows a membrane 700 between a diaphragm 702 and support members 704 with a reinforcement member 706. FIG. 10 shows a diaphragm 800 between a membrane 802 and support members 804 without a reinforcement member.

Figure 11:
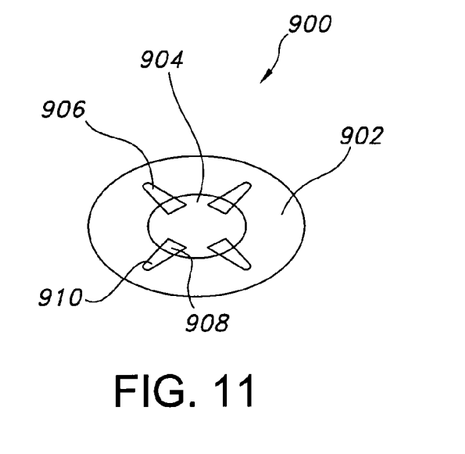
FIG. 11 shows an airbag having membrane different thicknesses according to one embodiment of the present invention.

As stated above, the amount or rate of gas released from an airbag when and after an occupant impacts the airbag may depend, at least in part, on the thickness of support members associated with a membrane and/or diaphragm. FIG. 11 shows an airbag portion 900 with an adaptive vent 902 that includes a membrane 904 and support members 906. The support members 906 may include a first area 908 having a first thickness and a second area 910 having a second thickness. The membrane 904 may have a third thickness that is less than the first thickness. The thickness of the membrane 904 may be designed such that the membrane 904 breaks open when the pressure in the airbag elongates or otherwise expands the support members 906. The thickness of the first area 908 may be selected to prevent the membrane 904 break from affecting the second area 910. The thickness of the second area 910 may be selected based on the desired elongation attributes of the support members 906.

Figure 12:
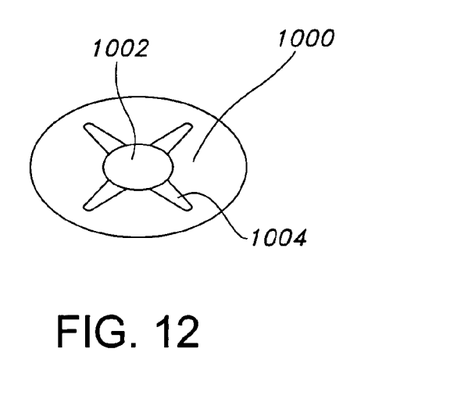
FIG. 12 shows a second embodiment of an airbag having a membrane with different thicknesses.
Figure 13A:
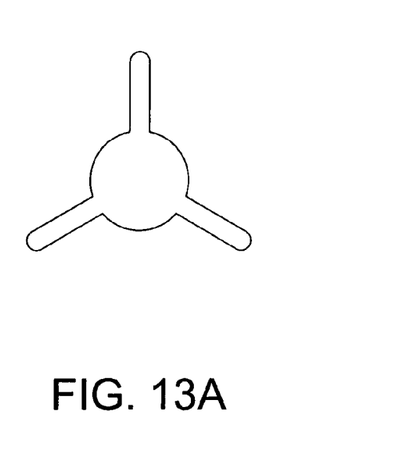
FIGS. 13A-E show membrane shapes according to various embodiments of the present invention.
Figure 13B:
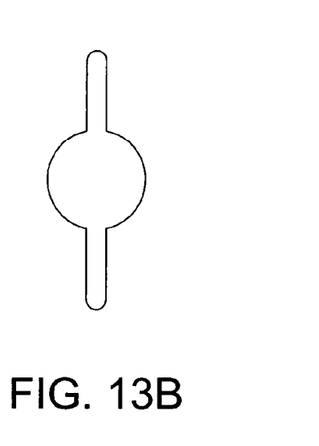
Figure 13C:
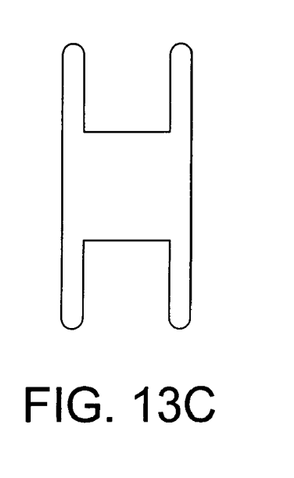
Figure 13D:
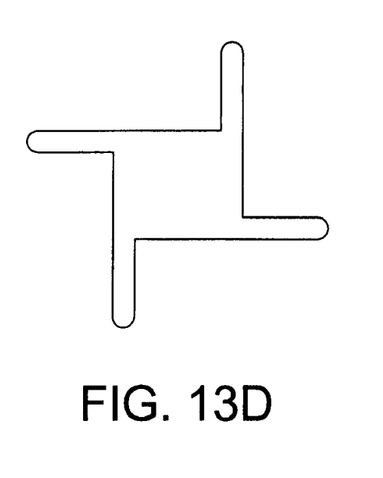
Figure 13E:
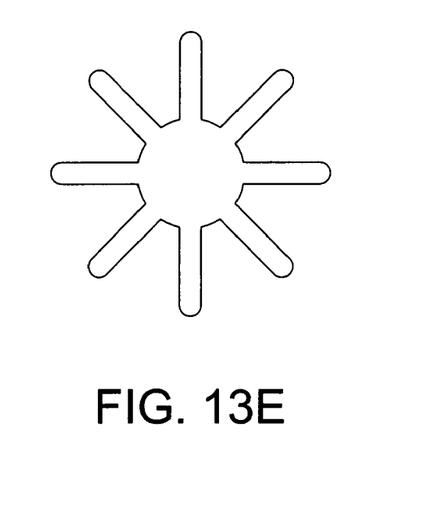
Figure 14A:
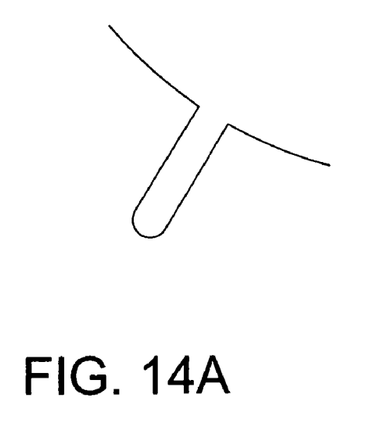
FIGS. 14A-D show membrane support members according to various embodiments of the present invention.
Figure 14B:
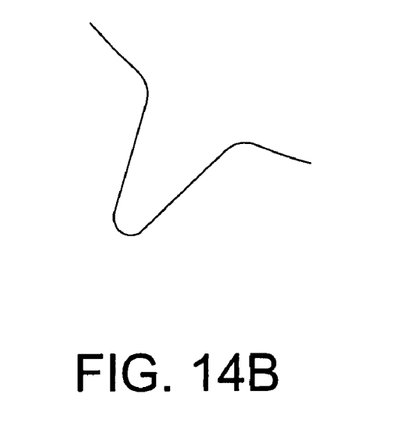
Figure 14C:
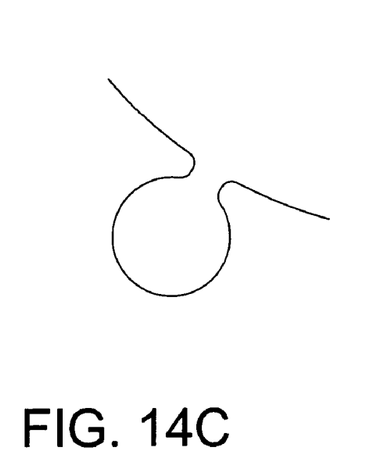
Figure 14D:
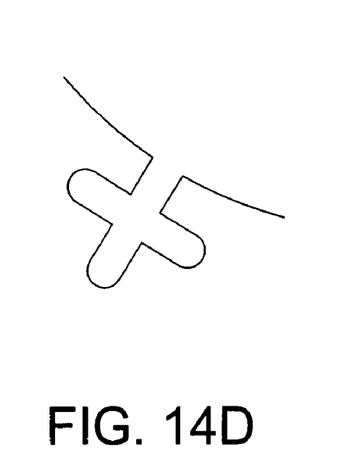

In other embodiments, an example of which is shown in FIG. 12, an adaptive vent 1000 may be provided having a membrane 1002 with a first thickness and support members 1004 having a second thickness. The thickness of the support members 1004 can be greater than the thickness of the membrane 1002 and selected based on the desired elongation attributes of the support members 1004.

The amount and/or rate at which gas is released from airbags of certain embodiments of the present invention may be based, at least in part, on the shape or size of adaptive vent. For example, a membrane and support members may be shaped in a desirable fashion to provide the number of support members and membrane shape necessary to release gas at a desired level when an occupant impacts the airbag. FIGS. 13A-E illustrate a variety of adaptive valves according to various embodiments of the prevent invention. The adaptive valves shown in FIGS. 13A-E may include a silicone membrane that has been cut to a desired shape and having a desired number of support members. The embodiments shown in FIGS. 13A-E may be included in adaptive vents with or without diaphragms.

Support members according to some embodiments of the present invention may be shaped to provide a desired performance. FIGS. 14A-D illustrate various embodiments of support members that have been cut to various shapes. The support members may have different elongation attributes depending, in part, on the shape of the support member and provide the system with variable gas release performance, as desired.

Figure 15:
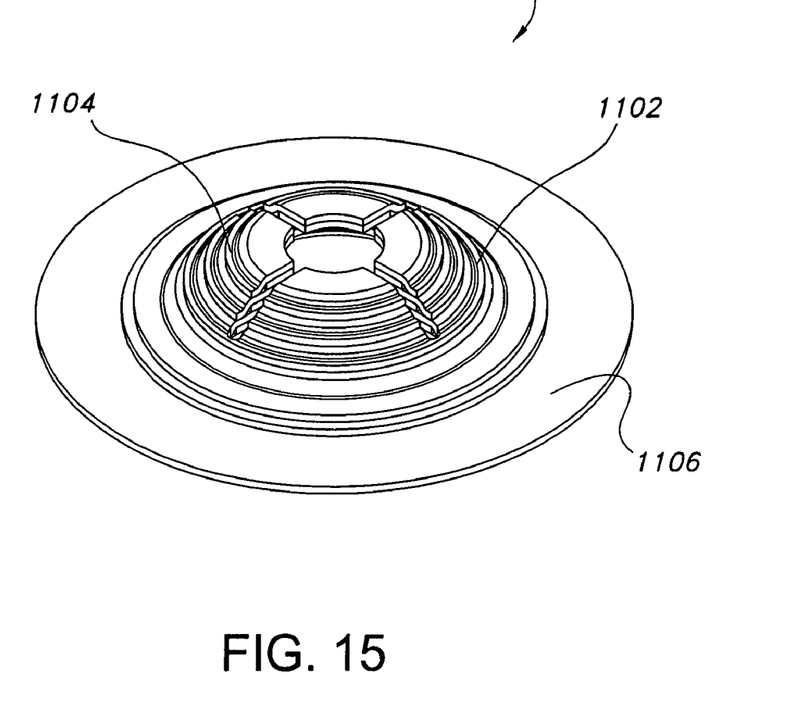
FIG. 15 is a perspective view of an airbag having multiple diaphragms according to one embodiment of the present invention.
Figure 16:
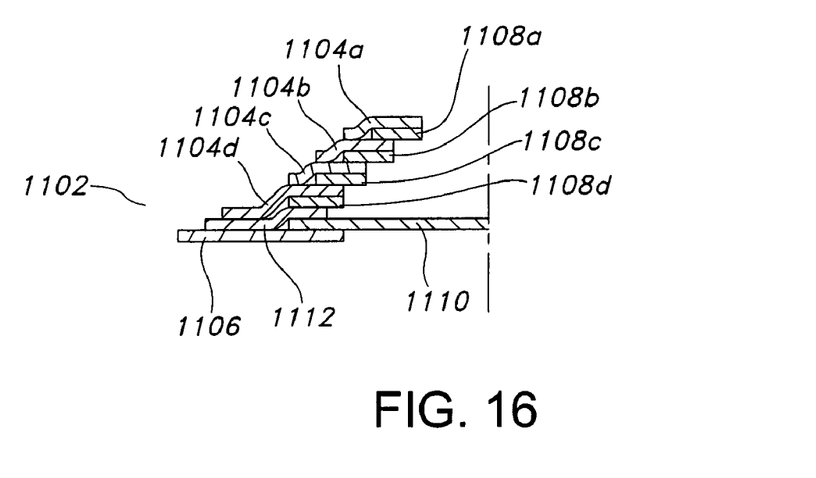
FIG. 16 is a side view of the airbag of FIG. 15.

Embodiments of the present invention including an adaptive vent having a diaphragm may include multiple diaphragms. FIG. 15 illustrates an airbag portion 1100 with an adaptive vent 1102 containing a plurality of diaphragms and support members 1104 connecting the diaphragms 1102 to airbag fabric 1106. The plurality of diaphragms are adapted to contract at different airbag pressures, providing an adaptive vent that can release gas at different stages depending on the pressure in the airbag and can be used in systems with or without membranes. FIG. 18 illustrates a side view of a portion of the adaptive vent 1102 with a plurality of diaphragms 1108a-d and a membrane 1110. The diaphragms 1108a-d are connected to airbag fabric 1106 with support members 1104a-d. A membrane support member 1112 may be provided to connect the membrane 1110 to the airbag fabric 1106.

The foregoing is provided for purposes of illustrating, explaining, and describing embodiments of the present invention. Further modifications, adaptations and additional components added to these embodiments will be apparent to those skilled in the art and may be made without departing from the scope or spirit of the invention.

What is claimed is:

1. An airbag vent comprising:
   a membrane covering an opening in an airbag, the membrane is configured to prevent gas from substantially exiting the airbag before an occupant impacts the airbag;
   a membrane support member connecting the membrane to the airbag, wherein the membrane support member is adapted to elongate as a pressure in the airbag increases, the membrane support member being configured to elongate an amount based in part on a shape of the membrane support member and the pressure in the airbag; and
   a diaphragm connected to the airbag fabric by a support member, wherein the support member is adapted to elongate as the pressure in the airbag increases and is adapted to cause the diaphragm to contract to allow gas to be released from the airbag,
   wherein the membrane is adapted to move to an open position when the membrane support member elongates as the pressure in the airbag increases to allow gas to be released from the airbag,
   wherein the membrane at the open position is configured to remain connected to the membrane support member.

2. The airbag vent of claim 1, wherein the membrane and membrane support member are silicone.

3. The airbag vent of claim 1, wherein the membrane allows more gas to be released as the pressure in the airbag increases.

4. The airbag vent of claim 1, wherein the membrane support member is glued to the airbag.

5. The airbag vent of claim 1, wherein the airbag vent comprises a plurality of membrane support members.

6. The airbag vent of claim 1, wherein the amount of gas released is based on at least one of:
- a number of membrane support members;
- the shape of the membrane support member;
- a thickness of the membrane support member; and
- a modulus of the membrane support member.

7. The airbag vent of claim 1, wherein the diaphragm and support member are silicone.

8. The airbag vent of claim 1, wherein the support member is the membrane support member.

9. The airbag vent of claim 1, wherein elongation of the membrane support member adapts a size or a shape of the opening based on the pressure in the airbag,
   wherein the amount of gas released through the opening is based on the size or the shape of the opening.

10. The airbag vent of claim 1, wherein the membrane is coupled to the membrane support member with glue.

11. An airbag vent comprising:
   a diaphragm;
   a membrane covering an opening;
   a support member connecting the diaphragm and the membrane to an airbag, wherein the support member is adapted to elongate as a pressure in the airbag increases and cause the diaphragm to contract, the diaphragm being configured to cause more gas to be released as the pressure in the airbag increases, the support member being configured to elongate an amount based in part on a shape of the support member and the pressure in the airbag; and
   wherein the diaphragm contraction allows the membrane to move to an open position to release gas from the airbag through the opening, the amount of gas released being based on the pressure in the airbag,
   wherein the membrane at the open position is configured to remain connected to the support member.

12. The airbag vent of claim 11, wherein the diaphragm and support member are silicone.

13. The airbag vent of claim 11, wherein the support member is glued to the airbag.

14. The airbag vent of claim 11, wherein the adaptive vent comprises a plurality of support members.

15. The airbag vent of claim 11, wherein the amount of gas released is based on at least one of:
- a number of support members;
- the shape of the support member;
- a thickness of the support member; and
- a modulus of the support member.

16. The airbag vent of claim 11, wherein the membrane and the support member are silicone.

17. The airbag vent of claim 11, wherein the support member is a membrane support member.

18. The airbag vent of claim 11, wherein diaphragm contraction adapts a size or a shape of the opening based on the pressure in the airbag,
   wherein the amount of gas released through the opening is based on the size or the shape of the opening.

19. An airbag comprising:
   an airbag fabric;
   an opening associated with an airbag vent, the vent comprising:
      a membrane adapted to cover the opening and prevent gas from substantially exiting the airbag before an occupant impacts the airbag; and
      a membrane support member connecting the membrane to the airbag fabric, wherein the membrane support member is adapted to elongate as a pressure in the airbag increases, the membrane support member being configured to elongate an amount based in part on a shape of the membrane support member and the pressure in the airbag; and
   a diaphragm connected to the airbag fabric by a support member, wherein the support member is adapted to elongate as the pressure in the airbag increases and is adapted to cause the diaphragm to contract to allow gas to be released from the airbag,
   wherein the membrane is adapted to move to an open position when the membrane support member elongates to release gas from the airbag, the amount of gas released being based on the pressure in the airbag,
   wherein the membrane at the open position is configured to remain connected to the membrane support member.

20. The airbag of claim 19, wherein the membrane and membrane support member are silicone.

21. The airbag of claim 19, wherein the membrane allows more gas to be released as the pressure in the airbag increases.

22. The airbag of claim 19, wherein the vent comprises a plurality of membrane support members.

23. The airbag of claim 19, wherein the amount of gas released is based on at least one of:
- a number of membrane support members;
- the shape of the membrane support member;
- a thickness of the membrane support member; and
- a modulus of the membrane support member.

24. The airbag of claim 19, wherein the diaphragm and support member are silicone.

25. The airbag of claim 19, wherein the support member is the membrane support member.

* * * * *